United States Patent [19]
Doyle

[11] 3,713,208
[45] Jan. 30, 1973

[54] ARMATURE WINDING METHOD

[75] Inventor: James N. Doyle, Dayton, Ohio

[73] Assignee: The Globe Tool and Engineering Company, Dayton, Ohio

[22] Filed: Sept. 3, 1971

[21] Appl. No.: 177,618

[52] U.S. Cl. .................29/597, 29/598, 242/7.03, 242/7.05 B, 310/234
[51] Int. Cl. ...............................H01r 43/00
[58] Field of Search..............29/596, 597, 598, 605; 242/7.05 R, 7.05 A, 7.05 B, 7.05 C, 7.03; 310/234–237

[56] References Cited

UNITED STATES PATENTS

| | | | |
|---|---|---|---|
| 3,244,917 | 4/1966 | Gute | 310/237 X |
| 3,628,229 | 12/1971 | Biddison et al. | 29/597 X |
| 2,779,886 | 1/1957 | Hunsdorf | 242/7.05 R X |
| 3,163,921 | 1/1965 | Applegate | 242/7.05 R X |
| 3,585,716 | 6/1971 | Steinke | 29/597 |
| 3,451,633 | 6/1969 | Markham et al. | 242/7.18 X |

Primary Examiner—Charles W. Lanham
Assistant Examiner—Carl E. Hall
Attorney—Roger S. Dybvig

[57] ABSTRACT

A double loop of wire is formed about a commutator hook before an armature coil is wound, the double loop gripping the hook with sufficient strength to withstand the force generated when the first coil is being wound tending to pull the wire away from the hook. While forming the double loop, the free end of the wire is clamped, the clamped wire portion being severed after the double loop is formed. During the forming of at least the second loop, the wire is positively guided into hooking relation to the commutator hook.

8 Claims, 7 Drawing Figures

PATENTED JAN 30 1973 3,713,208
SHEET 1 OF 2
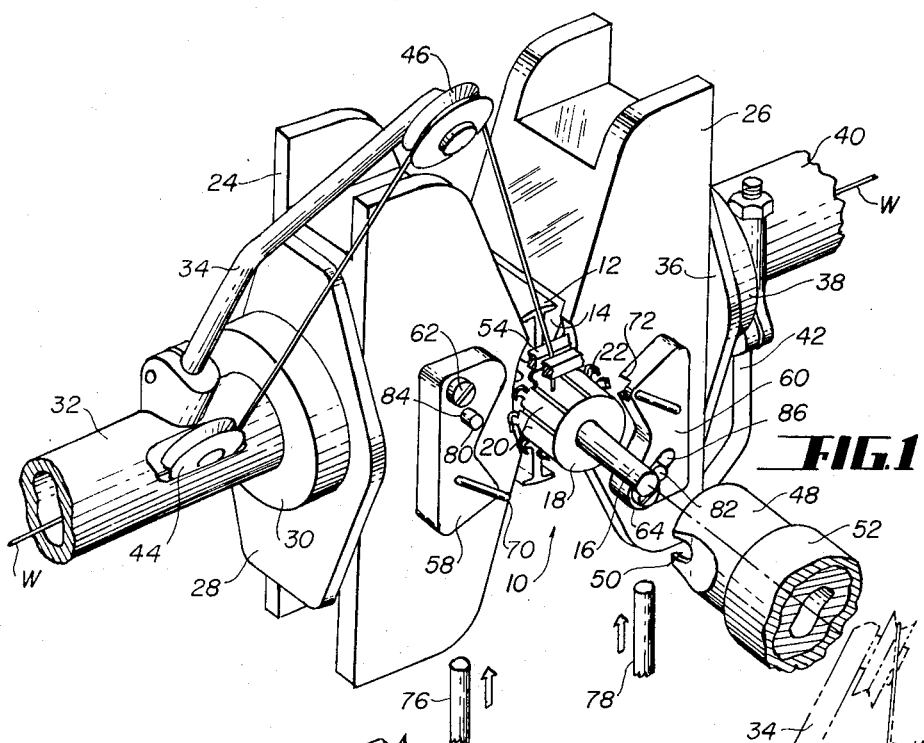
FIG.1
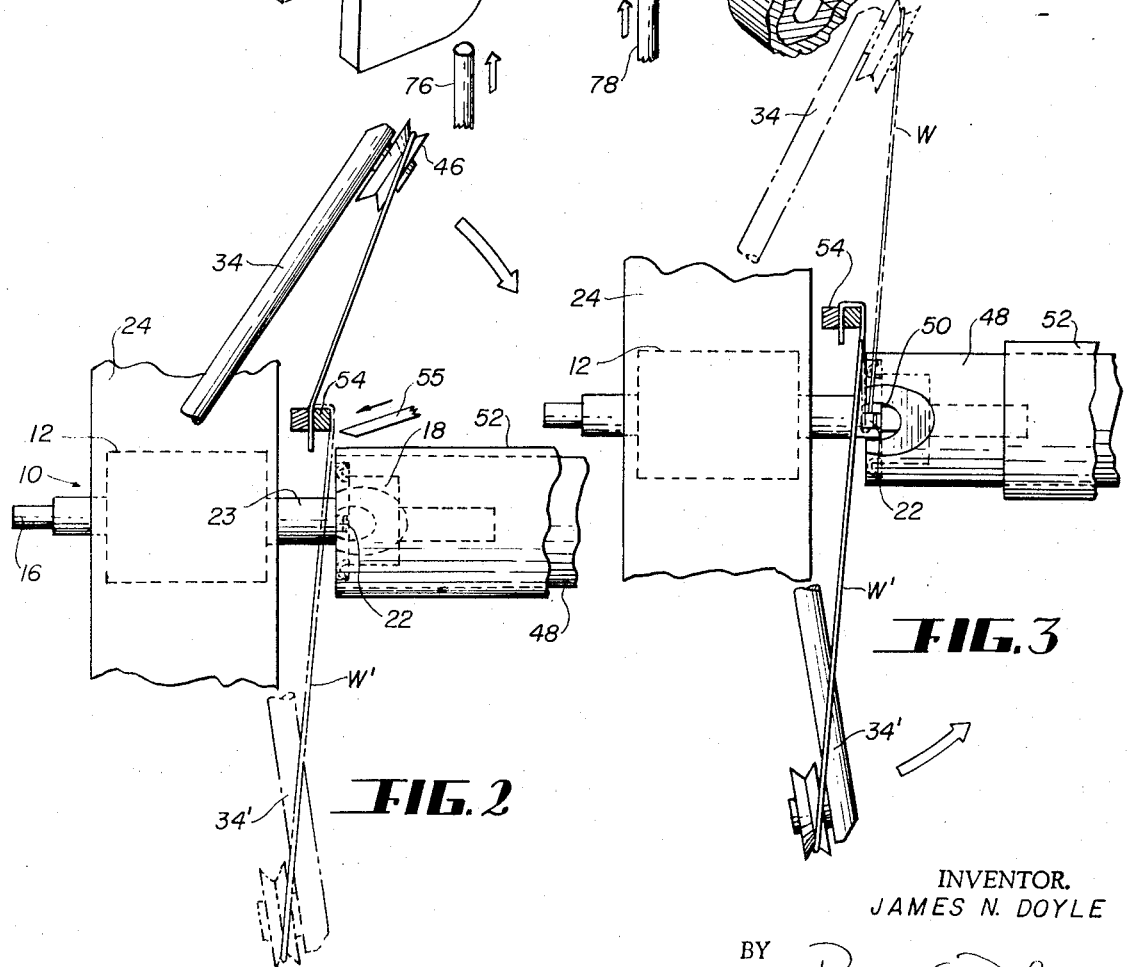
FIG.2
FIG.3
INVENTOR.
JAMES N. DOYLE
BY Roger S. Dybvig
ATTORNEY

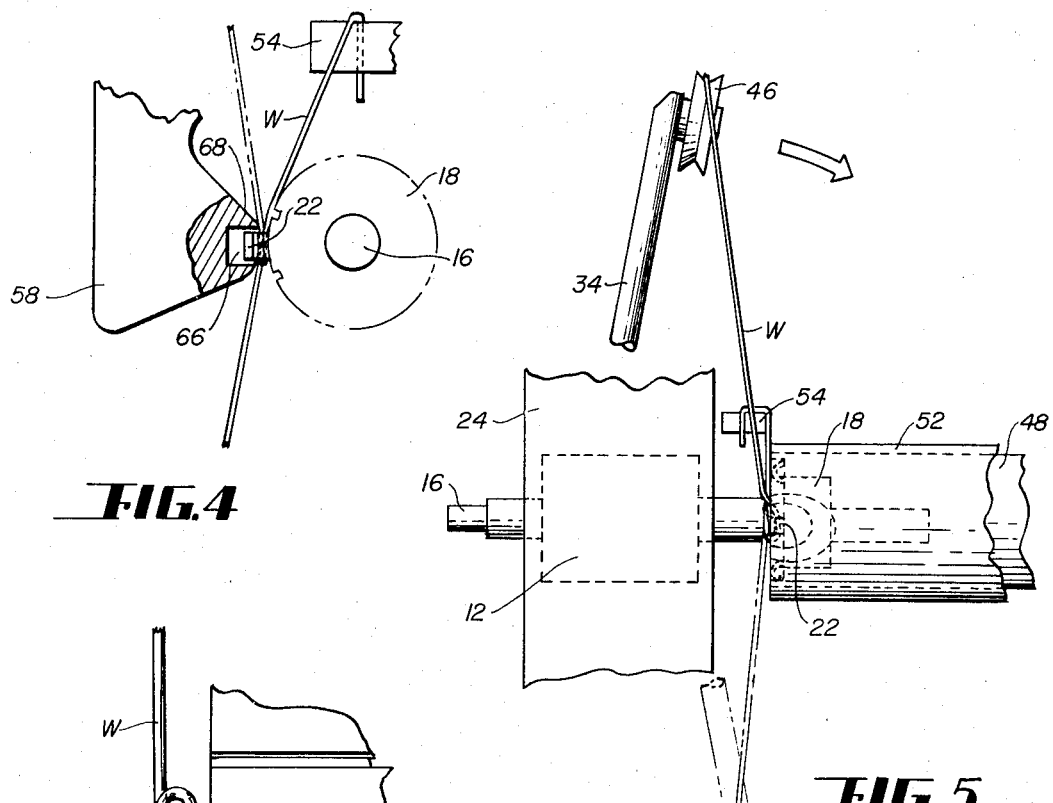
FIG. 4
FIG. 5
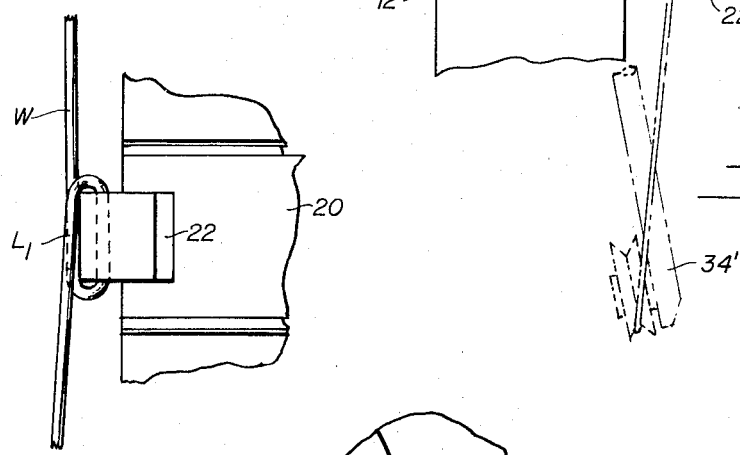
FIG. 6
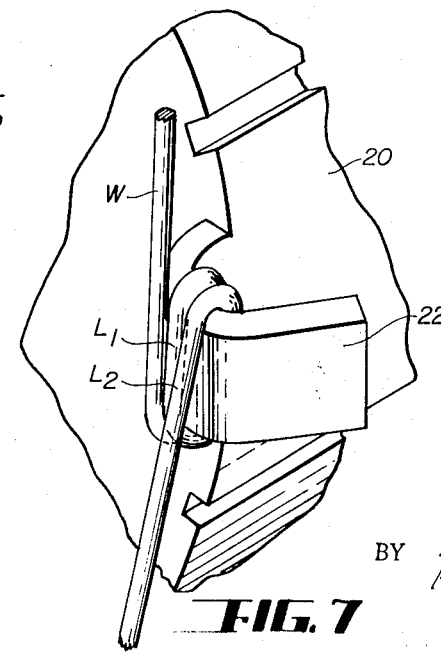
FIG. 7
INVENTOR.
JAMES N. DOYLE
BY Roger S. Dybvig
ATTORNEY

ARMATURE WINDING METHOD

The method is disclosed in connection with a double flier armature winding machine.

BACKGROUND OF THE INVENTION

This invention relates to an armature winding method and more particularly to the connection of first wire leads to commutator tangs or hooks in preparation for the winding of coils by a flier type armature winding machine.

U.S. Pat. No. 3,506,864 discloses an armature winding method in which the wire leads between coils, as well as the start and finish leads, are connected to the commutator hooks by being looped about the hooks. Other armature winding methods include the looping of lead wires about the hooks.

Mechanisms and methods have been developed for trimming the start and finish wires of armatures close to the commutator hooks to which these start and finish wires are connected. Examples of apparatus for this purpose are shown in patent application, Ser. No. 812,258 of John M. Biddison and Clarence W. Donnaker, filed in the U.S. Pat. Office on Apr. 1, 1969, and in application, Ser. No. 97,488, filed on Dec. 14, 1970, by John M. Biddison, both of which are assigned to the same assignee as the instant application. In the Biddison application, Ser. No. 97,488 the finish wires are engaged by clamps located between the commutators and the fliers and the finish wires are severed between the clamps and the commutator hooks to which they are connected. At the beginning of the winding of another armature, the start wires for that armature are severed between the clamps and the commutator hooks to which they are connected. The use of such apparatus results in a minimum wastage of wire. Other apparatus has been developed for the same purpose.

At the start of the winding of an unwound armature, as described in the Biddison application, the wires between the clamps and the fliers are looped about a pair of commutator hooks. Before the winding of the first coils it may be necessary or desirable to sever the wire between the clamps and the hooks after the first loops are formed. The cutting of the wire at this time may be necessary if, because of the winding pattern or lead arrangement desired, the armature has to be indexed through a considerable angle or if the construction of machine parts is such that the wire clamps must be removed from the winding area before the fliers begin to wind the first coils.

It has been found that if the wires are cut between the clamps and the hooks about which the start wires are looped before the first coils are wound, the forces exerted by the fliers as they begin to wind the first coils tend to pull the start wires away from the hooks and the connections between the start wires and the hooks may be lost.

SUMMARY OF THE INVENTION

This invention provides a method for attaching the start wires to the commutator hooks wherein the grip of the start wires to the hooks is sufficiently strong that the start wires remain connected as the fliers wind the first coils. Therefore, it is possible to sever the start wires between the hooks and the clamps before the winding commences. Basically the method involves the forming of a double loop of wire about each hook, the double loop being sufficient to cause the wires to firmly grip the hooks and withstand the forces which result from the indexing of the armature or rotation of the fliers. In order to form the double loops about the hooks, one end of each of the wires is held in fixed relation to the hooks and the wires then positively guided through the use of known mechanisms about the hooks.

BRIEF DESCRIPTION OF THE DRAWINGS

FIG. 1 is a partially exploded perspective view of a double flier armature winding machine of the type which can be used in the practice of this invention. FIG. 1 also shows an armature located between the winding forms thereof.

FIG. 2 is a side elevational view of parts of the winding machine and of the armature of FIG. 1 illustrating the first step in the forming of a start wire loop about a commutator hook.

FIGS. 3 and 5 are similar to FIG. 2 but illustrate additional steps in the looping sequence.

FIG. 4 is an elevational view with parts broken away illustrating the manner in which the wire is positively guided about the hook during the step illustrated in FIG. 3.

FIG. 6 is a side elevational view of a portion of the commutator and a hook and showing the first loop of wire formed about the hook.

FIG. 7 is a perspective view of the same portion of the commutator illustrated in FIG. 6 but showing a double loop wound in accordance with this invention.

DESCRIPTION OF THE PREFERRED EMBODIMENT

Referring to FIGS. 1 and 2, this invention is concerned with the commencement of the winding of an armature of the type generally designated 10 which includes an armature core 12 having radially inwardly directed coil receiving slots 14 mounted on an armature shaft 16. A commutator 18 is mounted upon the same shaft and has a plurality of segments 20 terminating in tangs or hooks 22. The section of the shaft 16 between the core 12 and the commutator 18 is covered by an insulating sleeve 23 (FIG. 2).

A portion of a double flier winding machine used for winding the armature 10 is shown in FIG. 1 and includes left and right side (as viewed in FIG. 1) wire guide wings or winding forms, designated 24 and 26 respectively, the armature 10 being supported at least partly by the confronting concavely curved surfaces thereof. The left side winding form 24 is mounted upon a mounting plate 28 which in turn is supported on a bearing housing 30 that rotatably receives a flier spindle 32 on which is affixed a flier 34. The right side winding form 26 is similarly mounted on a mounting plate 36 affixed to a bearing housing 38 rotatably receiving a spindle 40 for a flier 42.

As conventional, wire, designated W, is dereeled from a supply spool (not shown) and coursed through the spindle 32 around a pulley 44 mounted for rotation thereon and another pulley 46 mounted for rotation at the terminal end of the flier 34. Another strand of wire W is similarly threaded onto the flier 42. As well known to those skilled in the art, the fliers 34 and 42 may be rotated to wind coils, two at a time, in spaced slots 14 of the core 12. Appropriate machine control devices (not shown) are provided for spreading the winding forms 24 and 26 when an armature is inserted or removed, for rotating the fliers 34 and 42 in proper timed sequence, and for indexing or rotating the armature 10 as required to present new pairs of slots in position to receive coils wound by the fliers.

During the intervals in which the fliers 34 and 42 are rotating to wind coils, it is necessary to shield the commutator hooks 22 so that the wires are not accidentally hooked thereover. For this purpose a fixed, hollow, cylindrical inner shield 48 is partially illustrated which, in use, surrounds the commutator 18. The shield 48 has a pair of diametrically opposed notches 50, only one of which is illustrated, the other being hidden from view. The notches 50 are located in a generally horizontal plane, the shield 48 covering all of the hooks 22 except the two diametrically opposed hooks located in the generally horizontal plane, thereby exposing these hooks. During the winding of coils, the hooks 22 exposed by the notches 50 are covered by a movable outer shield or sleeve 52 that is slidably driven in any suitable fashion relative to the inner shield 48. When lead wire connections are to be made to the hooks 22, the outer shield 52 is retracted to also expose the generally horizontally located hooks 22.

During the winding of coils by a double flier armature winding machine, such as that disclosed, the two fliers rotate in opposite directions as viewed from the front or back of the machine. Thus with reference to the orientation of parts as viewed in FIG. 1, the left side flier 34 would rotate in a "top coming" direction while at the same time the right side flier 42 rotates in a "top going" direction. For purposes of description of this invention, the operations of the two fliers 34 and 42 may be identical and would be except in the well known case of the winding of armatures having an odd number of slots. Therefore, the continued description of the instant invention is made only with reference to the left side flier 34, it being understood that the right side flier would operate in an identical fashion.

A wire clamp 54 consisting of a pair of jaws is illustrated in each of FIGS. 1–5. The wire clamp 54 is located generally above the commutator 18 and closely adjacent to the uppermost commutator hook 22. Here it will be understood that there is another wire clamp which is not shown but which would be concerned with the operation of flier 42 and would be located generally beneath the commutator 18. The specific construction and operation of the wire clamp 54 is unimportant for purposes of this invention. Briefly, it clamps the wire W in preparation for the cutting of the wire after one armature is completely wound and the final lead wire connections are made. After the wire is clamped, a cutter mechanism, as partially illustrated by blade 55 in FIG. 2, severs the wire between the clamp 54 and the adjacent hook 22. When both wires between the fliers and the wound armature have been clamped and cut, the wound armature is removed. Thereafter, an unwound armature, such as the armature 10, is gripped by the winding forms 24 and 26, indexed to appropriately locate the hooks 22 and slots 14 relative to the fliers, and the winding of the unwound armature commences. For purposes of more fully showing the various parts in FIG. 1, the shields 48 and 52 are shown spaced from their operative positions. Except for the shields 48 and 52, FIG. 1 illustrates the position of the parts at the beginning of the winding of the unwound armature 10. The same position of the flier 34 and the wire W is shown in full lines in FIG. 2. The commencement of the winding of the armature is as follows.

Referring to FIG. 2, with the outer shield 52 located in covering relation to the hooks 22, the flier 34 is rotated in a clockwise direction as viewed in FIG. 2 to bring the wire across the rear face of the commutator 18, that is, the face of the commutator 18 confronting the armature core 12. This direction of rotation of the armature 34 is called the "forward" direction because it is the same direction that the flier 34 rotates when winding coils. The position of the flier 34 and the wire W after the forward direction of rotation is illustrated by phantom lines 34' and W', respectively, in FIG. 2. As will become apparent, this movement of the flier 34 is the first step in looping the wire W about the generally horizontally positioned hook 22 labeled in FIG. 2.

FIG. 3 illustrates the next step in the looping of the wire about the same hook 22. Here the flier 34 and the wire are shown in full lines at their positions 34' and W'. The outer shield 52 is retracted away from the core 12 thereby to expose the hook 22 lying in the generally horizontal plane which is otherwise exposed by the notch 50. The flier 34 is then reversely rotated, that is, rotated in a counterclockwise direction as indicated by the arrow in FIG. 3, whereupon the wire W is hooked under and across the front face of the commutator hook 22. With reference to FIG. 5, the looping of the wire about the hook 22 is completed by extending the shield 52 again into covering relation to the hook 22 and then forwardly rotating the flier 34 back to the position 34' thereof, whereupon the wire W is again brought across the rear face of the hook 22. A first loop $L_1$ is thus formed about the hook 22, the first loop being most clearly illustrated in FIG. 6.

The looping of the single loop of wire $L_1$ about the hook 22 as shown in FIG. 6 is sufficient for the starting of the winding of some types of armatures, and it is possible to sever the wire W between the hook 22 about which the wire is looped and the clamp 54 before the commencement of the winding of the first coil by the left side flier 34. However, when winding armatures with relatively fine wire, that is, on the order of 20 gauge or higher, or when the armature must be indexed through a significant angle before the winding of the first coils, it has been found that a single wire loop about the hook will not reliably remain looped as the first coil is wound, because the force tending to pull the wire away from the hook generated by the rotation of the flier is sufficiently strong that the wire will at least occasionally unwind off the hook. In accordance with this invention, this problem is overcome in simple manner by the use of the same tooling and machine parts used in the past.

With reference to FIG. 7, the same segment 20 and the same hook 22 are illustrated as are shown in FIG. 6. However, in FIG. 7 a double loop has been formed about the hook 22, the first loop $L_1$ being formed as described above. The second loop, which is designated $L_2$, is formed by repeating the operations illustrated and disclosed in connection with FIGS. 3 and 5. That is, after the formation of the loop $L_1$ as illustrated in FIG.

5, the second loop L₂ is then formed by first retracting the shield 52 and then rotating the flier 34 in the reverse direction as illustrated in FIG. 3 to cause again the hooking of the wire about the hook 22. The shield 52 is then again extended and the flier 34 rotated in the forward direction, whereupon it is returned to its position illustrated at 34' as shown in FIG. 5. The wire can then be severed between the clamp 54 and the hook 22 to release the end of the wire wrapped about the hooks 22. (Preferably the armature is first indexed to position the hook 22 more closely to the clamp 54 before the wire is severed.) The flier 34 can then be rotated in the forward direction to wind the first coil.

It has been observed that the wires doubly looped about the hooks 22 may slightly unravel or unwind as the fliers commence the winding of the first pair of coils. The unwinding is demonstrated by the fact that the severed, released ends of wires rotate through a relatively small angle about the hooks 22 as the first coils are wound. This slight unwinding is unobjectionable and in practice may be beneficial because the severed ends of the wires tend to point inwardly toward the armature shaft 16. With very fine wire the severed ends may even ultimately be located in the bights of the hooks. In practice it has also been found that the gripping of the hooks 22 by the double loop is much greater than might be expected. Apparently the strong grip results from the face that, with the free ends of the wires clamped, the first loops are drawn tight around the hooks as the second loops are formed. Accordingly, in addition to the extra wire bends provided by the second loops, the wire bends of the first loops are more severe and hence more resistant to unwinding. Here it may be observed that in some cases the complete forming of the second loops may not be essential. That is, with reference to FIG. 5, the flier 34 could be stopped in the full line position illustrated and the clamped wire portion severed at that point. However, usually it is preferred that the second loop be completely formed for whatever added gripping power is thereby obtained and also to remove the section of wire leading from the commutator hook 22 to the flier pulley 46 from the area of the clamped wire portion, because that is the area in which the cutter, such as the cutter blade 55, will be operating.

It is necessary, at least in most cases, to positively guide the wires into hooking relation about the commutator hooks 22 at the beginning of the forming of the second loop L₂. Otherwise the wires would not become hooked but would merely slide over the faces of the hooks 22 confronting the core 12 even though the hooks 22 are exposed. The same problem may be encountered when hooking the wires as illustrated in FIG. 3 for the forming of the first loops L₁ but the problem in the case of the forming of the first loops can be minimized or obviated in many cases by appropriately locating the positions of the clamps such as the clamp 54 relative to the hooks 22.

Apparatus suitable for positively guiding the wires about the hooks 22 at the beginning of the forming of the loops L₂ is illustrated in FIGS. 1 and 4. This apparatus may be identical to apparatus disclosed in FIGS. 7 and 8 of the patent application of Glen E. Bucholtz and James N. Doyle, Ser. No. 106,176, filed Jan. 13, 1971, and assigned to the same assignee as the instant invention. Since other apparatus could be used for positively guiding the wires about the hooks 22, and since the apparatus disclosed in the aforementioned application, Ser. No. 106,176 is otherwise not part of this invention, it is not disclosed in detail herein. Briefly the apparatus includes two wire guide members, designated 58 and 60, pivotally mounted at 62 and 64, respectively, upon the winding forms 24 and 26. Wire guide member 58 cooperates with flier 34, whereas member 60 cooperates with flier 42. Member 58 has a notch 66 for receiving a hook 22, a wire guide surface portion 68 confronting the commutator 18, and another wire guide surface 70 located on the front face of the member 58. Guide member 60 similarly has a notch 72 and wire guide surface portions corresponding to surface portions 68 and 70.

In operation the guide members 58 and 60 are normally positioned by suitable bias means (not shown) located within the winding forms 24 and 26 at pivotal positions at which the notches 66 and 72 are remote from the commutator 18. When the outer shield 52 is retracted to expose the two generally horizontally located hooks 22, the members 58 and 60 are pivoted to bring the notched portions 66 and 72 thereof into covering relation to the exposed hooks 22. Accordingly, as the fliers are reversely rotated to cause the wires to be hooked about the commutator hooks 22, the wires are guided by the wire guide surface portions of the members 58 and 60 toward the commutator 18 and around the front faces of the hooks 22 as is illustrated in FIG. 4. The members 58 and 60 are pivotally rotated about the pivot pins 62 and 64 by movement of vertically movable drive fingers 76 and 78 which are normally out of the winding area but which are moved upwardly to engage and actuate drive members (not shown) slidably mounted in the winding forms 24 and 26 and which have integral drive pins 80 and 82, respectively, located in slots 84 and 86, respectively, in the members 58 and 60. After the hooking of the wires as illustrated in FIGS. 3 and 4, the drive fingers 76 and 78 are retracted from the winding area, the notched portions of the guide members 58 and 60 thereupon being again biased away from the commutator 18. Although the positive guiding of the wires may only be essential when hooking the wires for the second loops, it is both convenient and good practice to use the same apparatus for positively guiding the wires around the hooks 22 when forming the first loops.

Although the presently preferred embodiment of this invention has been described, it is understood that various changes may be made within the scope of the appended claims.

Having thus described my invention, I claim:

1. In a method of winding armatures of the type having a slotted armature core and a commutator with hooks on the end thereof confronting said core with an armature winding machine of the type having at least one rotating flier for laying wire into pairs of armature slots to form coils therein, the steps of holding one end of the wire to be used in winding coils in fixed relation to an armature to be wound and, while continuing to hold the wire, forming by said armature winding machine a first loop of wire about a preselected commutator hook by relatively moving said armature and the wire extending between said one end and said flier, said first loop being formed by hooking the wire about said commutator hook and then continuing the wire on around said hook, thereafter again hooking by said armature winding machine the wire about said commutator hook by relatively moving said armature and the wire extending between said one end and said flier while continuing to hold the end of said wire in fixed relation to the armature, and thereafter releasing the said end of wire adjacent said hook.

2. The method of claim 1 wherein said wire is hooked about said commutator hook by rotation of a flier and wherein said wire is positively guided into hooking relation with said commutator hook.

3. The method of claim 1 further including the step of continuing to loop said wire about said commutator hook thereby to form two complete loops about said commutator hook before releasing the end of said wire adjacent said hook.

4. The method of claim 1 wherein said wire is released by severing the end of the wire between the point at which it is held and said commutator hook.

5. In a method of winding armatures of the type having a slotted armature core and a commutator with hooks on the end thereof confronting said core utilizing a flier type winding machine, the steps of holding the free end of a wire from a flier in fixed relation to an armature to be wound and forming by said flier type winding machine two loops of the wire about a preselected commutator hook by relatively moving said armature and the wire extending between said free end and said flier prior to the winding of a coil by said flier.

6. In a method of winding armatures of the type having a slotted armature core and a commutator with hooks on the end thereof confronting said core with a flier type winder, the steps of clamping the free end of wire leading from the flier in a fixed position relative to the armature to be wound, positioning the flier at a location wherein a section of the wire extends from the clamped portion thereof to the flier between the armature core and the commutator, exposing a preselected commutator hook, rotating the flier in a direction to hook said section of wire about said preselected commutator hook, shielding said preselected hook, rotating the flier to loop the section of wire about said preselected commutator hook, again exposing said preselected hook, and rotating said flier to again hook said section of wire about said preselected commutator hook.

7. The method of claim 6 wherein the flier is rotated to hook the wire about said preselected commutator hook in a direction opposite to the direction the flier is to be rotated when winding coils.

8. The method of claim 6 wherein the wire is positively guided around said preselected commutator hook when the flier is rotated to cause the wire to be hooked about said preselected commutator hook.

* * * * *